UNITED STATES PATENT OFFICE.

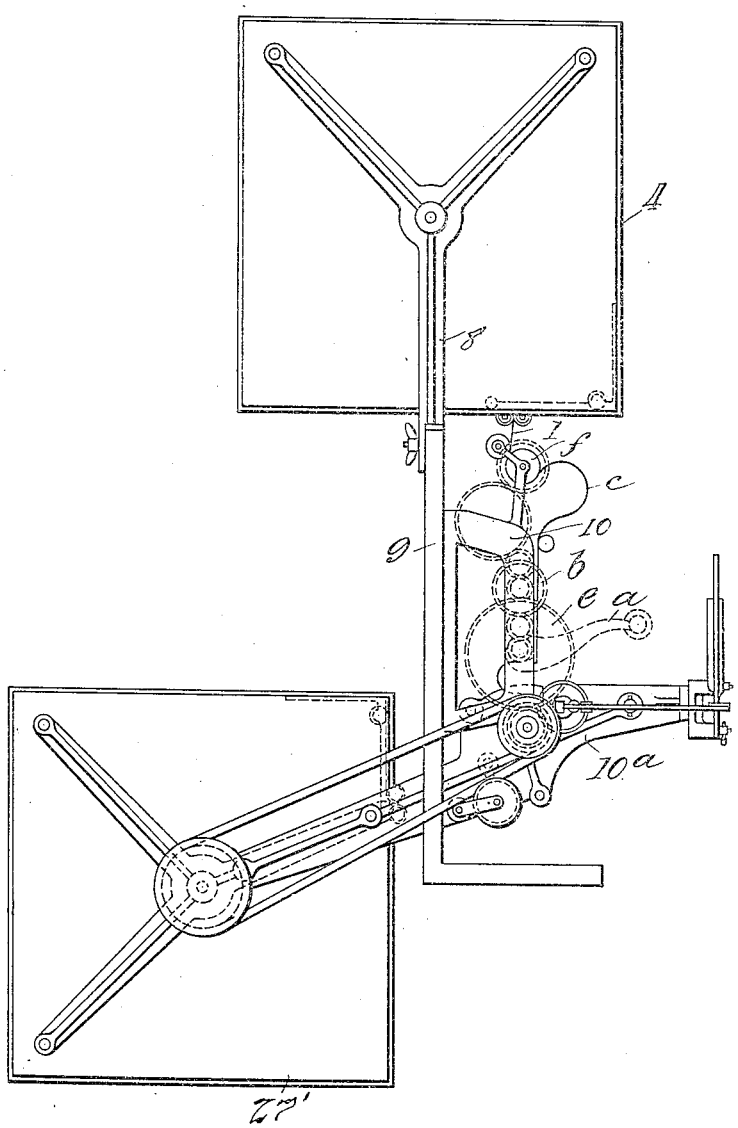

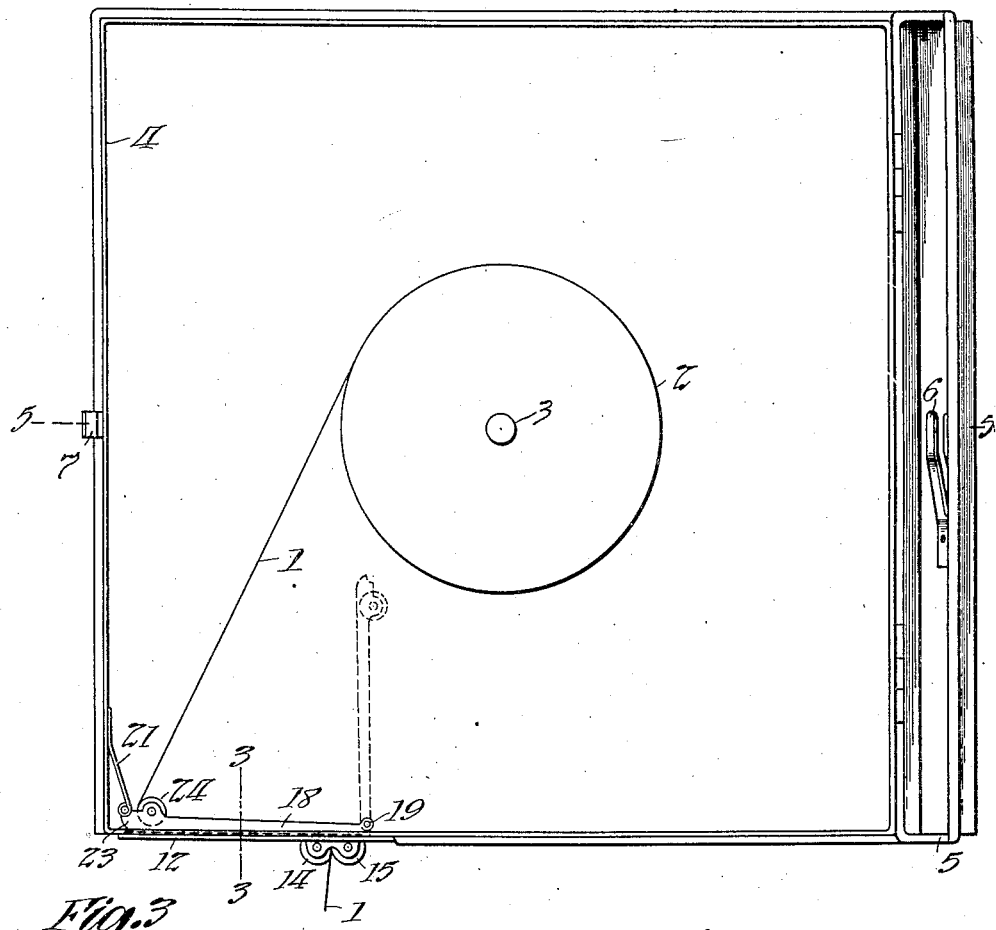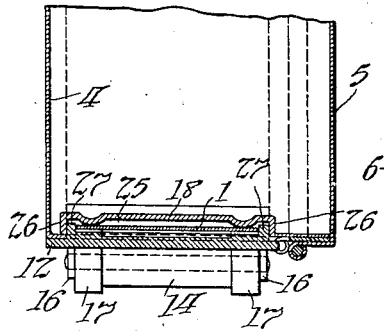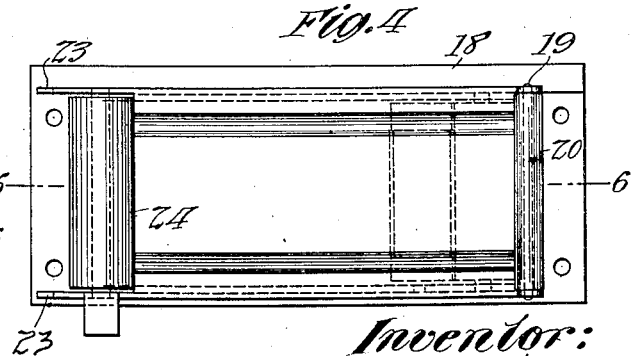

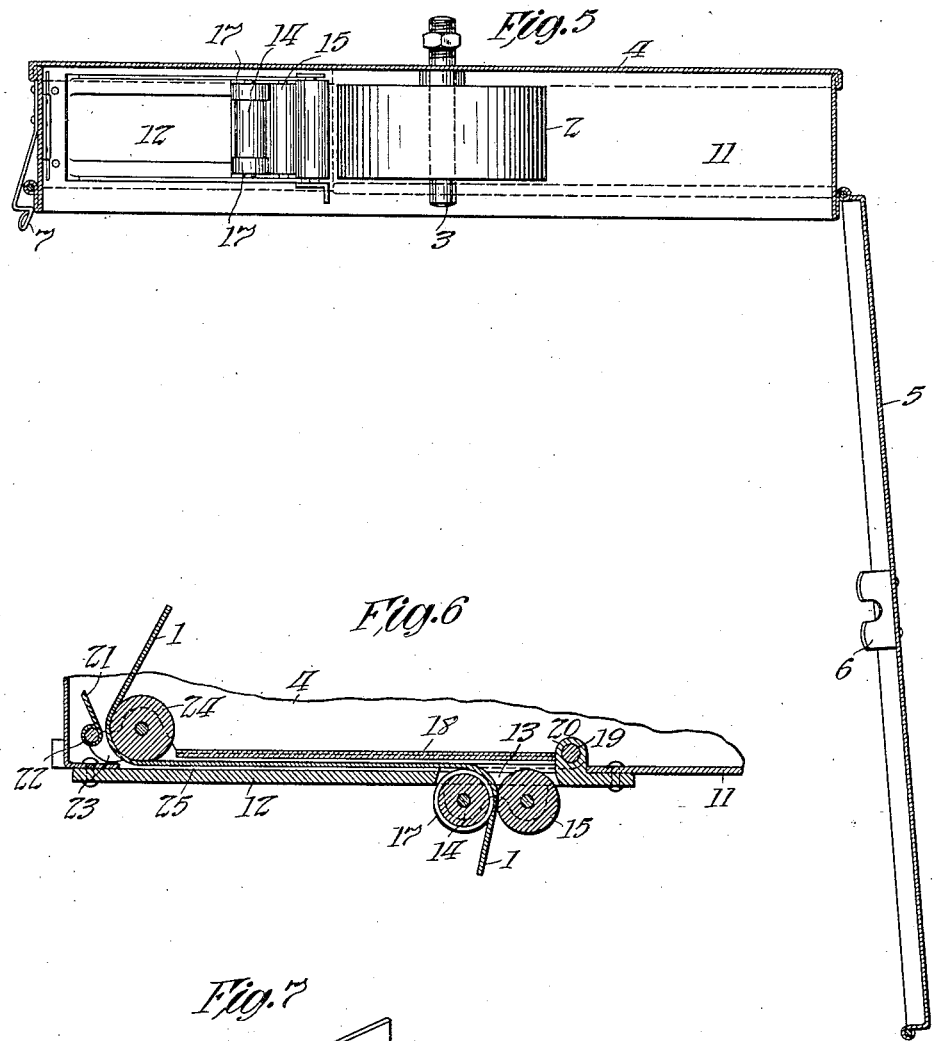

EDWARD L. AIKEN, OF ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

MOTION-PICTURE-PROJECTING APPARATUS.

1,272,174.   Specification of Letters Patent.   Patented July 9, 1918.

Original application filed November 8, 1905, Serial No. 286,424. Divided and this application filed July 25, 1912, Serial No. 711,399. Renewed December 13, 1916. Serial No. 136,812.

*To all whom it may concern:*

Be it known that I, EDWARD L. AIKEN, a citizen of the United States, and a resident of Orange, in the county of Essex and State of New Jersey, have invented certain new and useful Improvements in Motion-Picture-Projecting Apparatus, of which the following is a description.

This application is a division of my application Serial No. 286,424, filed November 8, 1905, on which Patent No. 1,037,188 was granted to me on September 3, 1912.

My invention relates to apparatus for the projection of moving pictures. In apparatus of this character, as is pointed out in Patent No. 967,293, granted to me on August 16, 1910, it is important that the film upon which the pictures are carried shall not be exposed to the heat emanating from the projecting light for more than a very brief interval of time, because such films are ordinarily composed of celluloid or like inflammable material and the heat referred to is sufficient to ignite such a film very quickly. Ordinarily, since the film travels rapidly past exposure position it does not become heated to a dangerous extent, but in case the mechanism becomes deranged so as not to properly feed the film, or in case the operator fails to properly operate the said mechanism, that part of the film in front of the exposure opening may become ignited and the fire spread to the remainder of the film and to other inflammable materials with disastrous results.

The principal object of the present invention is the provision of an improved receptacle for holding the supply and take-up reels on which the body of the film is contained; so that if the portion of the film situated between said receptacles becomes ignited, the flame will be effectively smothered before reaching the body of the film, whereby the danger of conflagration is minimized. Although in the apparatus herein illustrated there is very little danger of the film becoming ignited owing to the use of automatic means for shutting off the light from the film when the same is not being moved with sufficient rapidity, which means is specifically described and claimed in the application above referred to, it is to be understood, of course, that this invention is applicable to apparatus not provided with such means, and in which this danger is very considerable.

With the above and related objects in view, my invention consists in the combinations of elements and construction of parts hereinafter more specifically described and claimed.

In order that my invention may be more clearly understood, attention is directed to the accompanying drawings forming a part of this specification, in which the same reference characters are used to designate corresponding parts throughout and in which:—

Figure 1 is a side elevation of a complete apparatus constructed in accordance with my invention;

Fig. 2 is a detail view of one of the reel receptacles or boxes, the cover thereof being open;

Fig. 3 is a section on line 3—3 of Fig. 2;

Fig. 4 is a detail plan view of the hinged plate shown in Fig. 2;

Fig. 5 is a section on line 5—5 of Fig. 2;

Fig. 6 is a section on line 6—6 of Fig. 4; and

Fig. 7 is a view of the spring by which the hinged plate of Fig. 4 is held in its closed or operative position.

The traveling film 1 is contained upon a supply reel 2 which turns freely upon a pin 3 rigid with the box or receptacle 4. This box is provided with a hinged cover 5 which carries a spring 6 for pressing upon and retarding the reel 2 when the cover is in its closed position, a latch 7 being provided for holding the cover in said position. The box 4 is rigid with a standard 8 which is secured to a vertical main support 9 by which the frame 10 of the apparatus for manipulating the film is also supported. The bottom wall 11 of the box 4 is cut away as shown in Fig. 6 and the cut away portion is covered by a plate 12 riveted to the bottom 11. This plate is provided with an aperture 13 in which is situated a pair of rollers 14 and 15, the same being journaled in lugs 16 depending from and integral with the plate 12. The intermediate portion of the roller 14 is cut away forming collars 17, 17 at the ends thereof. The space between the inner peripheries of the collars 17 and the roller 15 is just sufficient to permit the passage of the film therebetween, and as the film is drawn down by the feed mechanism, the rollers turn freely on their pintles to allow the film to pass without friction. The margins of the film bear against the collars 17 of the roller 14, whereby the part of the film intermediate its edges, that is, the part upon which the pictures are printed, will be protected against any injury. Above the plate 12 is hinged a plate 18 whose pivot pin 19 is journaled in a bearing 20 integral with the plate 12. The plate 18 during the operation of the projecting apparatus occupies the position shown in Fig. 6, being locked in such position by the spring latch 21. This latch consists of a plate of spring metal riveted at its upper end to the box 4 and carrying at its lower end a locking pin 22 which is adapted to engage the forward end of the ears 23 carried by the plate 18. Obviously, a slight pressure upon the latch 21 toward the wall of the box 4 will release the plate 18 and allow it to be turned on its pivot as indicated in dotted lines in Fig. 2, whereby the film 1 may be easily threaded between the rollers 14 and 15. Between the ears 23, 23 and journaled therein is a roller 24 around which the film 1 is adapted to pass in its path from the reel 2 to the rollers 14 and 15. When the plate 18 is in its normal position as in Fig. 6, a long narrow passage 25 is formed between the plates 18 and 12, the sides of which are closed by the depending flanges 26 of the plate 18 which overlap the vertical flanges 27 of the plate 12. (See Fig. 3). This restricted passage contains very little air, not enough to support combustion of the film 1 and as I have ascertained by experiment, the flame of a burning film is invariably smothered after traveling a very short distance into the said passage. The box 27' in which the take-up reel is located is similar in all respects to the box 4.

The mechanism for moving the film 1 step by step into the field of the projecting light is of the usual type comprising a continuous sprocket $f$ which forms a loop $c$ above the display opening and an intermittent feed sprocket immediately below the opening, a drive gear $e$ and gear train $b$ driven by the usual crank $a$ as indicated in dotted lines, Fig. 1, said gears and sprockets being all mounted in the frame 10. The attachment for automatically cutting off the light when the film is stationary, which forms the subject matter of the application Serial No. 286,424 referred to above, is carried by a frame $10^a$ attached to the frame 10.

Having now described my invention, what I claim and desire to protect by Letters Patent is as follows:—

1. In a moving picture apparatus, a film holder comprising a box having an opening for the passage of the film, a plate hinged to the box and forming with the wall thereof a long narrow passage leading from the opening to the interior of the box, and means for locking said plate in its closed position, substantially as set forth.

2. In a moving picture apparatus, a film holder comprising a box having an opening for the passage of the film, and a plate hinged to the box to form with the wall thereof a long narrow passage leading from the opening, said plate carrying a roller at its free end, substantially as set forth.

3. In a moving picture apparatus, a film holder comprising a box having an opening for the passage of the film, and a plate hinged to the box, said plate having depending flanges, whereby a long narrow passage may be formed between said plate and the wall of the box, the sides of which are closed by said flanges, substantially as set forth.

4. In a moving picture apparatus, a film holder comprising a box having an opening for the passage of the film, a pair of rollers on either side of said opening, a plate within said box extending parallel to the wall thereof from a point adjacent said rollers, and forming with said wall a long passage, the height of which is but slightly in excess of the thickness of the film, substantially as set forth.

5. In a moving picture apparatus, a film holder comprising a box having an opening for the passage of the film, a plate carried by said box and extending parallel to the wall thereof from a point adjacent said opening and forming with said wall a long passage, the height of which is but slightly in excess of the thickness of a film, and rolls at both ends of said passage, substantially as set forth.

6. In a moving picture apparatus, a film holder comprising a box having an opening for the passage of the film, and a pair of contacting rollers on either side of said opening, the intermediate portion of one of the rollers being cut away, forming collars at the ends thereof, the space between the inner peripheries of the collars and the other roller being just sufficient to allow the passage of the film, substantially as described.

7. In a moving picture apparatus, a film holder comprising a box having a cut-away portion, a plate secured to said box and covering said cut-away portion, said plate being provided with an opening for the passage of the film and a pair of upstanding flanges within the box, between which the film is adapted to pass, and a plate hinged to the interior of the box, said plate having depending flanges adapted to overlap the flanges of the plate, whereby a long narrow passage may be formed between said plates extending from the opening in the first plate to the interior of the box, substantially as described.

8. A film holder for moving picture apparatus comprising a container having an opening for the passage of the film, and movably mounted means adapted to coact with the wall of the container to form a long narrow passage leading from said opening, substantially as described.

9. In a moving picture apparatus, a film holder comprising a container having an opening for the passage of the film and provided with means coacting with the wall of the container to form a long narrow passage leading from said opening, substantially as described.

10. A film holder for moving picture apparatus comprising a container having an opening for the passage of the film, and a member hinged to the container and forming with the wall thereof a long narrow passage leading from said opening, substantially as described.

11. A film holder for moving picture apparatus, comprising a casing or housing, a long narrow guideway or passage having closed sides through which the film must pass into said casing or housing, said guideway having one end communicating directly with the interior of said casing or housing, and guiding means external to the casing or housing closely associated with the other end of said guideway or passage and preventing rubbing contact of the film with said guideway or passage, substantially as described.

12. A film holder comprising a casing, a long narrow guideway having closed sides through which the film must pass into or from said casing, said guideway having its inner end communicating directly with the interior of said casing, and guiding means for the film at the outer end of the guideway, substantially as described.

13. In a film receptacle, a casing for inclosing a coil of film, having an opening in its wall for the passage of film to or from said coil, and means carried by said casing for inclosing the film in a portion at least of its passage between said opening and said coil.

14. In a film receptacle, a casing having an opening in its wall for the passage of a strip of film, and means within said casing and leading from said opening for inclosing said film.

15. In a film receptacle, a casing for inclosing a coil of film, having an opening in its wall for the passage of film to or from said coil, and means for inclosing the film in a portion at least of its passage between said opening and the periphery of said coil.

16. In a film receptacle, a casing for inclosing a coil of film, having an opening in its wall for the passage of film to or from said coil, and means providing an inclosed passageway for the film in a portion at least of its passage between said opening and the periphery of said coil.

17. In a film receptacle, a casing for inclosing a coil of film having an opening in its wall for the passage of film to or from said coil, and means comprising a member pivoted to said casing for inclosing the film in a portion at least of its passage between said opening and the periphery of said coil.

18. In a film receptacle, a casing for inclosing a coil of film, and a device defining a passageway for inclosing the film in its passage to and from said coil, said device comprising a member hinged at one end to said casing.

19. In a film receptacle, a casing for inclosing a coil of film, having an opening for the passage of film to and from said coil, a trough for inclosing the film in a portion at least of its passage between said opening and said coil, leading from said opening, and a cover for said trough, said cover being hinged to said casing.

This specification signed and witnessed this 23rd day of July, 1912.

EDWARD L. AIKEN.

Witnesses:
WILLIAM A. HARDY,
ANNA R. KLEHM.